United States Patent [19]

Hirano et al.

[11] Patent Number: 4,545,968

[45] Date of Patent: Oct. 8, 1985

[54] METHODS FOR PREPARING CUBIC BORON NITRIDE SINTERED BODY AND CUBIC BORON NITRIDE, AND METHOD FOR PREPARING BORON NITRIDE FOR USE IN THE SAME

[75] Inventors: Shin-ichi Hirano; Shigeharu Naka, both of Nagoya, Japan

[73] Assignee: Toshiba Tungaloy Co., Ltd., Kawasaki, Japan

[21] Appl. No.: 667,802

[22] Filed: Nov. 2, 1984

[30] Foreign Application Priority Data

Mar. 30, 1984 [JP] Japan ................................. 59-63472
Mar. 30, 1984 [JP] Japan ................................. 59-63473
May 21, 1984 [JP] Japan ................................ 59-100682

[51] Int. Cl.$^4$ ............................................. C01B 21/06
[52] U.S. Cl. ......................................... 423/290; 501/96
[58] Field of Search ........................... 423/290; 501/96

[56] References Cited

U.S. PATENT DOCUMENTS 4,150,097  4/1979  Hough et al. ...................... 423/285
4,157,927  6/1979  Chew et al. ........................ 423/286

FOREIGN PATENT DOCUMENTS 141963   1/1938  Japan .
52-17838  5/1977  Japan .
56-37200  8/1981  Japan .
0074513   5/1983  Japan ................................ 423/290
58-34429  7/1983  Japan .

OTHER PUBLICATIONS

H. Sumiya et al., "High Pressure Synthesis of Cubic Boron Nitride from Amorphous State" Mat. Res. Bull., vol. 18, pp. 1203–1207, (1983).

Copy of Funtai Funmatsu Yakin Kyokai, Outline Booklet at Spring Congress Lecture, pp. 96 to 97, 1983.

*Primary Examiner*—John Doll
*Assistant Examiner*—Jackson Leeds
*Attorney, Agent, or Firm*—Schwartz, Jeffery, Schwaab, Mack, Blumenthal & Evans

[57] ABSTRACT

There are disclosed methods for preparing cubic boron nitride sintered body. One method involves pyrolyzing borazine and/or a borazine derivative to obtain a boron nitride; mixing said boron nitride and a catalyst composed of a metal and/or metallic compound; and reacting the mixture at a pressure of 3 GPa or more and at a temperature of 700° C. or more. Another method comprises the step of pyrolyzing borazine and/or a borazine derivative to obtain a boron nitride; mixing said boron nitride and a catalyst composed of a metal and/or metallic compound; reacting the mixture at a pressure of 3 GPa or more and at a temperature of 700° C. or more; and removing the catalyst from a formed product. The conversion rate into cubic boron nitride achieved with these methods is as high as 100%, and the obtained cubic boron nitride is highly pure and fine. Also disclosed is a method for preparing boron nitride by pyrolyzing at least one compound selected from the group consisting of borazine and/or a borazine derivative at a temperature of 150° to 700° C. and a pressure of 10 MPa or more.

23 Claims, 5 Drawing Figures

Temperature of pyrolysis (°C)

Temperature of pyrolysis (°C)

METHODS FOR PREPARING CUBIC BORON NITRIDE SINTERED BODY AND CUBIC BORON NITRIDE, AND METHOD FOR PREPARING BORON NITRIDE FOR USE IN THE SAME

BACKGROUND OF THE INVENTION

This invention relates to methods for preparing cubic boron nitride sintered body and cubic boron nitride as well as a method for preparing boron nitride for use in the same.

In recent years, much attention has been paid particularly to the sintered body of boron nitride as one of fine ceramics. With regard to kinds of boron nitride stable under a high pressure, cubic boron nitride and wurtzite boron nitride are known. Among them, sintered body of cubic boron nitride has been spotlighted of late because of being excellent in hardness and abrasion resistance, and new applications of cubic boron nitride to materials for tools are now considered to be promising. Further, since having an extremely high thermal conductivity and electrical resistance together, sintered body of cubic boron nitride is greatly expected as a heat sink material in high-density integrated circuits.

The techniques for manufacturing a cubic boron nitride sintered body stable under a high pressure, can be classified under two methods, an indirect method and a direct method. The indirect method comprises using a cubic boron nitride as the starting material which was prepared by the steps of converting a mixture of hexagonal boron nitride and a catalyst into cubic boron nitride through a reaction at high pressure and a high temperature, removing the used catalyst and the remaining unreacted hexagonal boron nitride from the system by chemical means, sintering the thus prepared cubic boron nitride under an ultra-high pressure and at a high temperature (e.g., 5 GPa or more and 1200° C. or higher), alternatively further adding thereto a cubic boron nitride powder, a binder mainly including TiN or $Al_2O_3$ and, if necessary, a metal and/or a metallic compound, and again carrying out a high-pressure and high-temperature reaction to prepare the cubic boron nitride sintered body. On the other hand, the direct method comprises using a boron nitride other than the cubic boron nitride as the starting material subjecting a mixture of the boron nitride and a catalyst to a high-pressure and high-temperature reaction, whereby the boron nitride is converted into cubic boron nitride and simultaneously the cubic boron nitride sintered body can be prepared. The prepared cubic boron nitride sintered body is composed of the direct bonding of cubic boron nitride grains.

Of these two methods, the former utilizes the two high-pressure and high-temperature treatment steps which involve great costs, but the latter requires such a costly treatment step only once. Therefore, it seems that the latter is more suitable than the former. This can be easily understandable because in the direct method, the conversion rate of hexagonal boron nitride into cubic boron nitride will be below 100% in most cases, and the remaining unreacted hexagonal boron nitride will noticeably impair properties and a performance of the prepared sintered body. Therefore, there are factors favoring synthesizing, by the direct method a cubic boron nitride sintered body stable under a high pressure.

On the other hand, for manufacturing pure cubic boron nitride stable under a high-pressure, there is a direct method which can be carried out under a hydrostatic pressure without using any catalyst and a catalytic method of using a specific catalyst material. The boron nitride, stable under a high pressure, which can be prepared in accordance with the direct method is a mixture of cubic boron nitride and wurtzite boron nitride, and thus pure cubic boron nitride cannot be manufactured by means of the direct method. On the other hand, with regard to boron nitride stable under a high pressure which was prepared by the catalyt method as disclosed in Japanese Patent Publications No. 14/1963 and No. 17838/1977,there is an advantage that they can be prepared even at a lower pressure and temperature than in the case of the direct method as well as they includes no wurtzite boron nitride. However, in these catalytic manufacturing methods, hexagonal boron nitride is used as a starting material, and there is a problem that conversion rate of the hexagonal boron nitride into cubic boron nitride is low.

The present inventors have found that the factors having the greatest influence on the conversion of the boron nitride starting material into cubic boron nitride the a crystallinity index and content of oxygen of the boron nitride starting material. On the basis of this finding, in Japanese Patent Publications No. 37200/1981 and No. 34429/19, methods are disclosed for manufacturing a cubic boron nitride sintered body and cubic boron nitride which comprise treating a mixture of hexagonal boron nitride and aluminum nitride as a catalyst at a high temperature and a high pressure under a condition of 2% by volume or less of an oxygen content of the mixture.

The present inventors have further studied the relation between the crystallizability of hexagonal boron nitride and the conversion rate, and as a result it has been confirmed that the boron nitride which has smaller crystallinity, i.e., amorphous boron nitride, has the highest conversion rate into cubic boron nitride (see Funtai Funmatsu Yakin Kyokai, Outline Booklet at Spring Congress Lecture, 1983, pp.96–97).

Moreover, the present, inventors' research has been extended to a group of various compounds usable as materials for amorphous boron nitride, and as consequence, they have accomplished this invention.

SUMMARY OF THE INVENTION

This invention can overcome problems associated with the above-mentioned conventional methods for manufacturing a cubic boron nitride sintered body and a cubic boron nitride, and an object of this invention is to provide a method for preparing a cubic boron nitride sintered body by means of a direct method which comprises converting a starting material into cubic boron nitride at an extremely high conversion rate and simultaneously forming a sintered body comprising cubic boron nitride and a catalyst.

Another object of this invention is to provide a method for preparing a cubic boron nitride by means of a catalytic method having a less amount of an impurity such as oxygen at an extremely high conversion rate of a starting material into cubic boron nitride.

Still another object of this invention is to provide a method for preparing amorphous boron nitride which is eligible as a starting material for the above-mentioned methods.

That is to say, the method for preparing a cubic boron nitride sintered body of this invention comprises the steps of:

pyrolyzing borazine and/or a borazine derivative to obtain boron nitride;

mixing said boron nitride with a catalyst composed of a metal and/or a metallic compound; and reacting the mixture at a pressure of 3 gigapascal (GPa) or more and at a temperature of 700° C. or more.

Further, the method for preparing cubic boron nitride according to this invention comprises the steps of:

pyrolyzing borazine and/or a borazine derivative to obtain boron nitride;

mixing said boron nitride with a catalyst composed of a metal and/or a metallic compound;

reacting the mixture at a pressure of 3 gigapascal (GPa) or more and at a temperature of 700° C. or more; and removing the catalyst from a formed product.

Moreover, the method for preparing boron nitride in high yield according to this invention comprises pyrolyzing at least one compound selected from the group consisting of borazine and a borazine derivative under conditions of at a temperature of 150° to 700° C. and at a pressure of 10 megapascal (MPa) or more.

DESCRIPTION OF THE PREFERRED EMBODIMENTS

Figure 1:
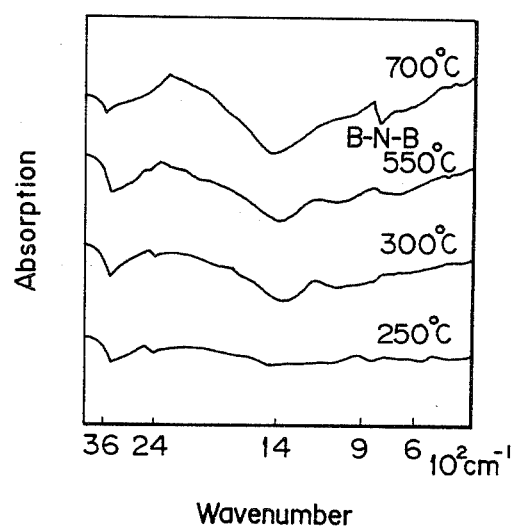
FIG. 1 is a diffraction pattern of infrared adsorption sepctrum showing a crystallizability of boron nitride prepared by the pyrolysis of borazine.

This invention will be explained in more detail in the following:

In the preparative method of the cubic boron nitride sintered body of this invention, boron nitride is first prepared by pyrolyzing borazine and/or borazinde derivatives. The condition of pyrolysis is not limited, but it is particularly preferable to carry out under the condition of a temperature of 150° to 700° C. and at a pressure of 10 MPa or more.

Borazine used in this invention is a compound having a following formula:

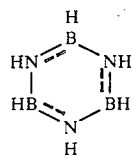

Further, borazine derivatives used in this invention include a compound having a chemical formula $B_xN_yH_z$ wherein x, y and z each represent an integer, and in view of handling, liquid or solid compound is more preferable. Examples of such compounds include borazonaphthalene represented by the following formula:

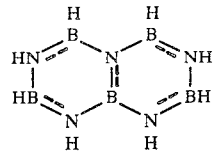

borazobiphenyl represented by the following formula:

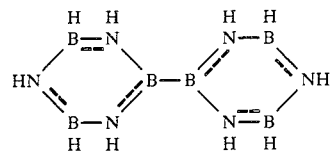

and 2,4-diaminoborazine represented by the following formula:

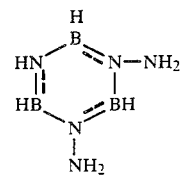

Of these materials, borazine is particularly preferable. It is significant that the used starting material includes neither oxygen nor carbon. This is that oxygen acts as a factor for lowering the conversion rate into cubic boron nitride and that carbon will remain in boron nitride when a pyrolyzing treatment is carried out under conditions described hereinafter. If the boron nitride including the remaining carbon component is subjected to a high-pressure and high-temperature synthetic treatment, this carbon component will be changed into graphite and will remain in the prepared cubic boron nitride, which graphite will lead to the deterioration in properties of the cubic boron nitride sintered body.

In the method of preparing boron nitride of this invention, the above-mentioned material is placed in a closed pressure vessel and is subjected to a pyrolyzing treatment.

In this case, the temperature and pressure are adjusted to the range of 150° to 700° C. and 10 MPa or more, respectively. As the pyrolyzing temperature rises, the content of hydrogen in the boron nitride will decrease but simultaneously the conversion rate into cubic boron nitride will also decrease. Therefore, the temperature of the pyrolysis is preferably adjusted to 700° C. or less. However, when the temperature of the pyrolysis is less than 150° C., the prepared boron nitride material will be too high in activity, and it will thus be necessary that the boron nitride material is handled in a $N_2$ gas or an inert gas atmosphere. In order to avoid such a troublesome handling, the temperature of the pyrolysis is preferably adjusted to 150° C. or more, as mentioned above.

Further, the pressure in the aforesaid treatment varies with an amount of borazine or a borazine derivative to be pyrolyzed, and it must be at a level enough to suppress hydrogen released from borazine or the borazine derivative during the pyrolyzing treatment. A satisfactory value of the pressure is 10 MPa or more.

A treatment period of time in this case is not particularly limited, but it is generally 10 minutes or more.

With regard to desirable conditions to obtain boron nitride which is high in conversion rate into cubic boron nitride and easy in handling as a starting material for this invention, the temperature is within the range of 200° to 300° C., the pressure is within the range of 50 to 150 MPa, and the pyrolyzing period of time is within the range of 30 to 120 minutes.

Then, in this invention, mixing the boron nitride obtained above with a catalyst composed of a metal and/or a metallic compound. The catalyst employed serves as the reaction agent of boron nitride or substrate for the nucleation site of cubic boron nitride under a pressure of 3 GPa or more and at a temperature of 700° C. or more to obtain cubic boron nitride sintered body.

That is to say, for example, this method comprises weighing predetermined amounts of the boron nitride obtained by pyrolysis of borazine and/or borazine derivatives (hereinafter referred to as "boron nitride according to borazine") and a preferable amount of catalyst under atmosphere of the dew point of −60° C. or lower, and mixing them under the same atmosphere of the above by means of a V-type mixer or the like. Then, with the resulting mixture, filling a vessel made of a metal such as Zr or Pt, or an inorganic compound such as cubic boron nitride or aluminum oxide. After replacing an atmosphere in the vessel with an inert gas such as nitrogen or argon, placing the vessel in a girdle type, a belt type or another type high-pressure and high-temperature device. And increasing a pressure therein up to 3 GPa or more, preferably up to the range of 5.0 to 8.0 GPa and a temperature therein up to 700° C. or more, preferably up to the range of 1200° C. to 2000° C., after the above conditions are maintained for a period of one minute or more, preferably for 5 to 30 minutes, decreasing the pressure and temperature therein to obtain the cubic boron nitride sintered body.

The conversion and sintering reaction of boron nitride according to borazine into cubic boron nitride is necessarily carried out under a predetermined pressure, and under such a pressure, a higher the temperature is associated with a higher the conversion rate as well as a faster sintering reaction rate. If the pressure is less than 3 GPa and the temperature is less than 700° C., the conversion rate of the boron nitride according to borazine into cubic boron nitride and the sintering reaction will be remarkably decreased. Therefore, the pressure and temperature to obtain the cubic boron nitride sintered body are determined to as 3 GPa or more and 700° C. or more, respectively.

The catalyst to be added to the boron nitride according to borazine may be those which have heretofore been used in the conversion into cubic boron nitride, and their examples include alkali metals such as Li, Na, K, Rb, Cs and Fr; alkaline earth metals such as Ca, Sr, Ba, Ra, Be and Mg; metals such as Al, Si, Ti, Zr, Hf, V, Nb, Ta, Cr, Mo, W, Sb, Sn and Pb; alloys thereof and metallic compounds such as $Li_3N$, $Li_3BN_2$, $Na_3N$, $Na_3BN_2$, $Ca_3N_2$, $Mg_3N_2$ and AlN. Of these catalysts, aluminum nitride is particularly preferable, because it of accelarating the conversion into cubic boron nitride and forms the direct bonding with synthesized cubic boron nitride grain without melting. When an amount of the catalyst to be added is within the range of 5 to 50 mole %, preferably within the range of 10 to 40 mole % based on the total amount, which is regarded as 100 mole %, of the boron nitride according to borazine and the catalyst. This reason is that when the amount of less than 5 mole %, a catalytic function will be weak, which manner will require a higher pressure and temperature to manufacture the sintered body including cubic boron nitride and aluminum nitride, and will thus be impractical; when it is more than 50 mole %, the catalytic function of aluminum nitride will reach an upper level, and additionally the obtained sintered body will advantageously be poor in hardness and abrasion resistance.

The cubic boron nitride sintered body obtained by this invention are composed of fine boron nitride having a low crystallinity and high-purity and a catalyst composed of a metal and/or metallic compounds as starting materials, and the obtained sintered body is compact and has a high hardness.

Further, in manufacturing method of cubic boron nitride sintered body of this invention, at least one, which is not a catalyst, selected from the group consisting of metals such as Fe, Ni and Co and metallic compounds of Ti, Zr, Hf, V, Nb, Ta, Cr, Mo, W and Si (e.g., carbides, nitrides, borides, silicides and oxides of these materials, and mutual solid solutions thereof) may be added to the mixture composed of boron nitride according to borazine and a catalyst as the starting materials, to obtain the dense sintered body having a high hardness.

Moreover, when a vessel is filled with a mixed powder including the boron nitride according to borazine, a catalyst and, if necessary, a metal and a metallic compound other than the catalyst so that the mixed powder may be brought into contact with a base such as a cemented tungsten carbide, a laminated composite hard product comprising the cemented tungsten carbide material and the cubic boron nitride sintered body can be obtained through a high-pressure and high-temperature treatment.

Next, the manufacturing method of the cubic boron nitride of this invention will be explained.

In the manufacturing method of the cubic boron nitride of this invention, at first a sintered body is produced in the same manner as in the method of the aforesaid cubic boron nitride sintered body. Then, removing the catalyst from the sintered body to prepare cubic boron nitride. In order to obtain the cubic boron nitride by removing the catalyst easily from the sintered body, it is particularly preferable that, in the manufacturing conditions of the sintered body, lowering pressure or temperature, for example, so as to become the conversion rate into the cubic boron nitride being about 70% or so.

The method for removing the catalyst is exemplified by, a method which comprises the steps of dipping the cubic boron nitride sintered body into a solution such as an acid, an alkaline or the like, and heating, if necessary, to dissolve and remove the catalyst. The residue thus treated to dissolve and remove the catalyst is further repeated a washing and drying treatment by using water, an organic solvent or the like, to obtain cubic boron nitride having less impurities.

More specifically, when the aluminum nitride is used as the catalyst, the aluminum nitride can be removed by dipping the sintered body into a caustic alkali solution of NaOH, KOH or the like at 200° to 400° C., or into a boiling aqueous strong caustic alkali solution such as NaOH. At this time, for example, when hexagonal boron nitride is remaining in the sintered body because of low conversion rate into cubic boron nitride, the hexagonal boron nitride can be removed physically by use of the difference of specific gravity between the cubic boron nitride and the hexagonal boron nitride.

The method for preparing cubic boron nitride of this invention can be converted at a high conversion rate into cubic boron nitride under the conditions of a low pressure and temperature.

Further, the cubic boron nitride obtained from this invention is highly pure and fine, therefore it is excellent in sintering properties. For example, when such a cubic boron nitride is mixed with other additives and the resulting mixture is then converted into a cubic boron nitride sintered body under high-pressure and high-temperature conditions, the production of the dense sintered body having a high hardness can be accomplished under low-pressure and low-temperature conditions.

In the present invention, the reason why the cubic boron nitride sintered body and the cubic boron nitride have been obtained in a high conversion rate is considered as follows:

The inventors of this invention have discovered that the lower the crystallinity of boron nitride is, the higher is the conversion rate into the cubic boron nitride, and that boron nitride prepared by the pyrolysis of borazine under a certain pressure includes an allowable amount of oxygen and particularly has the ideal low crystallinity. An experiment which is fundamental to these facts will be discussed as follows: First of all, borazine was formed by reducing B-trichloroborazine, and a golden capsule was airtightly filled with the borazine. A pyrolysis was carried out under a pressure of 100 MPa or less and at a temperature of 700° C. or less by the use of a hydrothermal synthetic device in order to prepare high-purity boron nitride. By a powder X-ray diffractometry, an infrared absorption spectroscopy and a transmission electron microscope, crystallizability and bonding state were investigated for high-purity boron nitride thus obtained. As a result thereof, it was elucidated that boron nitride formed by the heating treatment under a pressure of 100 MPa or less and at a temperature of 700° C. or less was such an amorphous as shown in FIG. 1. On the other hand, according to investigations on the morphology of high-purity boron nitride by the use of a scanning electron microscope, it was made definite that the above-mentioned high-purity boron nitride had a spherical or a fibrous shape. These results indicate that a cleavage reaction and a condensation reaction were carried out simultaneously under the coexistence of a gaseous phase and a liquid phase at the time of the pyrolysis of borazine under a certain pressure.

Figure 2:
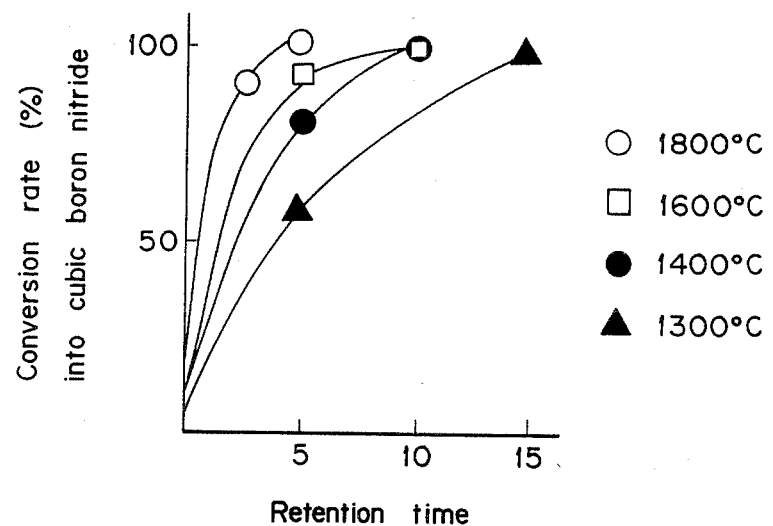
FIG. 2 is a graph showing a conversion rate of boron nitride prepared by the pyrolysis of borazine into cubic boron nitride under a pressure of 6.5 GPa.

Further, FIG. 2 shows the conversion rate of a mixture of amorphous boron nitride manufactured by pyrolyzing borazine under a pressure of 6.5 GPa and 20 mole % of aluminum nitride. Amorphous boron nitride can be converted into cubic boron nitride with more ease than crystalline boron nitride, and the activation energy for the conversion of amorphous boron nitride is at a level of 20 kcal/mol in the case of crystalline boron nitride. The above-mentioned results of researches occupy a fundamental portion of this invention.

Now, this invention will further be described in detail in reference to examples, but it should be noted that this invention is not limited thereto.

EXAMPLE 1

(1) Preparation of amorphous boron nitride

B-trichloroborazine was reduced to produce borazine. This borazine (liquid) was put in gold capsules, and these capsules were sealed and placed in a cone seal type pressure vessel. A pressure in the vessel was maintained at 100 MPa, and the capsules were treated at a variety of temperatures for one hour. At every temperature, a white solid was prepared.

Observing these solids for crystalline structure with a powder X-ray diffractometry, it was confirmed that all of the solids were amorphous. Further, for these white solids, an infrared (IR) absorption spectrum analysis was carried out, and there appeared absorptions based on stretching vibrations of N-H, B-H and B-N at positions of 3400 cm$^{-1}$, 2520 cm$^{-1}$ and 1400 cm$^{-1}$, respectively.

Figure 3:
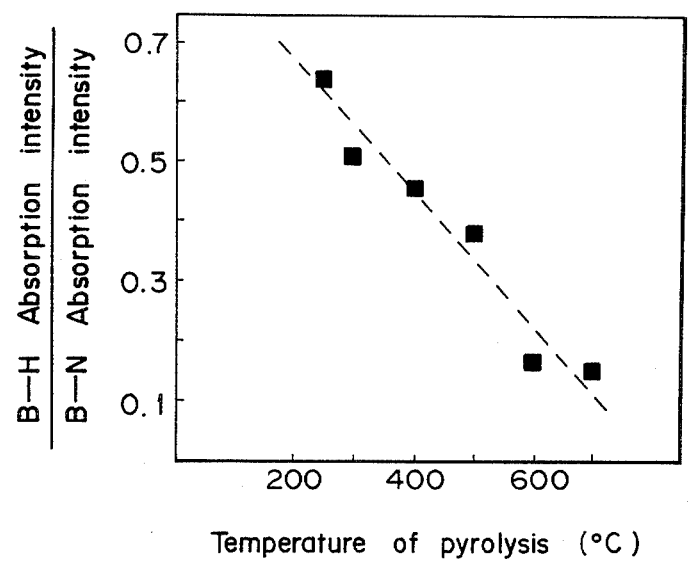
FIG. 3 is a diagram showing relations between ratios of B-N and B-H absorption intensities obtained by an IR analysis and temperatures of a pyrolysis with regard to amorphous boron nitride prepared in Example 1.

In FIG. 3, there are shown ratios of absorbances on the basis of the B-H and B-N stretching vibrations at various pyrolysis temperatures. As understood from this drawing, a content of hydrogen in amorphous boron nitride decreases, as the temperature of the pyrolysis rises.

(2) Measurement of conversion rate into cubic boron nitride

To each of the amorphous boron nitride products prepared at various temperatures by the pyrolysis were added 20 mole % of aluminum nitride, and mixing was then carried out. The resulting mixed powders were treated under conditions of a pressure of 6.5 GPa and a temperature of 1200° C. for 10 minutes in order to accomplish sintering.

For each of the prepared respective sintered bodies, an existence ratio of cubic boron nitride therein was measured by means of an X-ray diffractometry, and a conversion rate of amorphous boron nitride was calculated after the correction for the preferred orientation of particles on measuring by X-ray diffraction method.

Figure 4:
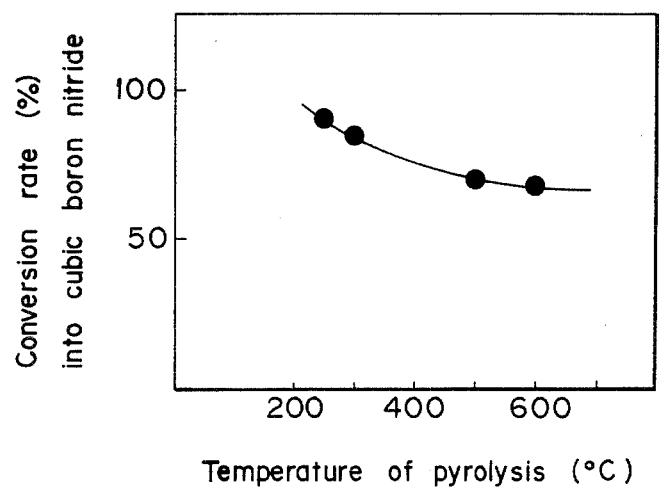
FIG. 4 is a diagram showing relations between molar conversion rates into cubic boron nitride and temperatures of pyrolysis.

The results are shown in the form of relations between the conversion rates and temperatures of the pyrolysis in FIG. 4. As is definite from this drawing, the amorphous boron nitride material prepared at a pyrolyzing temperature of 250° C. had as high a conversion rate as 90 mole %.

(3) Measurement of activation energy

Figure 5:
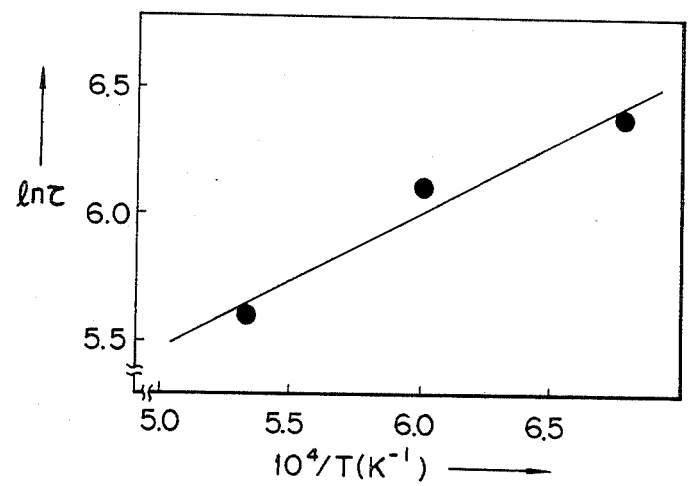
FIG. 5 is a straight diagram for calculating an activation energy, which shows relations between $\ln \tau$ and $10^4/T$.

The amorphous boron nitride prepared by pyrolyzing borazine at 250° C. was treated at temperatures (T) of 1200° C., 1400° C. and 1600° C. under a pressure of 6.5 GPa in order to measure reaction times ($\tau$) till the conversion rate from amorphous boron nitride to cubic boron nitride reached 90 mole %, and there was obtained such a straight line as shown in FIG. 5 which represented relations between ln $\tau$ and $10^4$/T. An activation energy in a direct conversion reaction from amorphous boron nitride to cubic boron nitride was about 11 kcal/mol when calculated from an inclination of this straight line.

Moreover, an activation energy in a direct conversion reaction from hexagonal boron nitride to cubic boron nitride was within the range of 150 to 250 kcal/mol, and an activation energy in the case that aluminum nitride was added to hexagonal boron nitride was about 40 kcal/mol.

These results indicate that the activation energy of amorphous boron nitride into cubic boron nitride regarding this invention is very low.

EXAMPLE 2

The same procedure as in Example 1 was repeated with the exception that borazobiphenyl was substituted for borazine in order to prepare white solids. These solids all were amorphous boron nitride products.

The thus prepared amorphous boron nitride were sintered at a temperature of 1500° C. and a pressure of 6 GPa for 20 minutes.

For each of the resulting sintered bodies, an amount of cubic boron nitride therein was analyzed by means of an X-ray diffractometry in order to calculate a conversion rate. The results are about the same as in FIG. 4 referred to above.

EXAMPLE 3

Borazine was decomposed at 700° C. in an argon atmosphere of 100 MPa to prepare boron nitride, and the thus prepared boron nitride and aluminum nitride were weighed out in the proportion of 80 mole % and 20 mole % respectively so that the total amount thereof might be 550 mg. These materials were mixed in an agate mortar in a globe box filled with argon, and a zirconium vessel was then charged with the resulting mixture. Next, this vessel was transferred to a desiccator, and deaeration was carried out by means of a vacuum pump and the desiccator was then filled with argon. In the desiccator, a lid was put on the vessel, and sealing was accomplished. Afterward, the vessel was taken out from the desiccator and was placed in a girdle type high-pressure and high-temperature device. The material in the vessel was treated at a temperature of 1300° C. and a pressure of 6.5 GPa for 15 minutes in order to prepare sample 1 according to the manufacturing method of this invention. It was found from results of an X-ray diffractometry that no hexagonal boron nitride was present in the thus prepared sintered body of sample 1, i.e. 100% of sample 1 was cubic boron nitride. Further, the sintered body of sample 1 was a dense sintered body, and as a result of a hardness measurement by a micro-Vickers, it was found that sample 1 had a hardness of 6000 kg/mm$^2$ HV.

For comparison, a mixture of 80 mole % of commercially available hexagonal boron nitride and 20 mole % of aluminum nitride was treated under the same high-pressure and high-temperature conditions as described above to prepare the sintered body of comparative sample 1, and as a result of an X-ray diffractometry, it was found that both cubic boron nitride and hexagonal boron nitride were present in the prepared sintered body, which had a hardness of 3000 kg/mm$^2$ HV.

EXAMPLE 4

Borazine was decomposed at 900° C. in an argon gas atmosphere of 100 MPa to prepare boron nitride, and the thus prepared boron nitride and aluminum nitride were weighed out in the proportion of 90 mole % and 10 mole % respectively so that the total amount thereof might be 500 mg. To these materials, 80 mg of a titanium/tantalum nitride solid solution (Ti, Ta)N$_{0.8}$, 10 mg of Al and 10 mg of Ni were added to prepare a mixed powder. The prepared powdery mixture was then handled in the manner as in Example 3 and was placed in a high-pressure and high-temperature device. Next, the mixture was treated at a pressure of 5.0 GPa and a temperature of 1800° C. for 5 minutes in order to prepare sample 2 according to the manufacturing method of this invention. It was found from results of an X-ray diffractometry that no hexagonal boron nitride was present in the sintered body of sample 2, i.e. 100% of sample 2 was cubic boron nitride. Further, the sintered body of sample 2 was a dense sintered body, and was 5300 kg/mm$^2$ HV in hardness.

For comparison, a mixture of 90 mole % of commercially available hexagonal boron nitride and 10 mole % of aluminum nitride was weighed out as much as 500 mg. To this mixture, there were added 80 mg of a titanium/tantalum nitride solid solution (Ti, Ta)N$_{0.8}$, 10 mg of Al and 10 mg of Ni in order to prepare a mixed powder. The prepared powdery mixture was treated according to a direct method under the same high-pressure and high-temperature conditions as described above, so that a sintered body of comparative sample 2 was prepared. It was found from results of an X-ray diffractometry that both cubic boron nitride and hexagonal boron nitride were present in the prepared sintered body, which had a hardness of 2400 kg/mm$^2$ HV.

EXAMPLE 5

The procedure of Example 3 was repeated with the exception that borzaonaphthalene was substituted for borazine in order to prepare boron nitride through a pyrolysis, and a mixture of 70 mole % of the thus prepared boron nitride and 30 mole % of aluminum nitride was weighed out as much as 450 mg. To the mixture, 100 mg of a TiN$_{0.8}$C$_{0.2}$ solid solution, 20 mg of WC, 15 mg of Ni and 15 mg of Mo were added in order to prepare a mixed powder, which was then handled in the same manner as in Example 3. This powdery mixture was introduced into a zirconium vessel while brought into contact with a 10 $\phi$mm $\times$2 mm cemented tungsten carbide (WC - 6% Co alloy), and was placed in a high-pressure and high-temperature device. Next, a treatment was carried out at a pressure of 8.0 GPa and a temperature of 1400° C. for 10 minutes to prepare sample 3 according to the manufacturing method of this invention, this sample 3 being a composite hard laminate of cubic boron nitride and the cemented tungsten carbide. It was found from the results of an X-ray diffractometry that no hexagonal boron nitride was present in sample 3, i.e. 100% of sample 3 was cubic boron nitride. Further, the sintered body of sample 3 was 5000 kg/mm$^2$ HV in hardness.

EXAMPLE 6

The respective sintered bodies prepared in Examples 3, 4 and 5 were each mounted, by a silver brazing, on a knife edge of JIS standard TNP 332 made from a WC - 10% Co alloy, and cutting test was carried out for the samples under the following conditions.

Conditions of cutting test by turning
Material to be cut: SKH 3 (HRc 59 to 62 hardened steel).
Cutting speed: 90 m/min.
Cutting width: 0.3 mm.
Feed rate: 0.1 mm/rev.
Cutting time: 20 min.

As a result of the cutting test, samples 1, 2 and 3 prepared according to the manufacturing method of this invention exhibited normal abrasion states, and no chipping occured on cutting edges thereof. On the contrary, the comparative samples 1 and 2 prepared in Examples 3 and 4 had about three times greater flank abrasion loss, a boundary abrasion also appeared, and chipping occured on the cutting adge thereof.

EXAMPLE 7

The procedure of Example 3 was repeated with the exception that the treatment in a girdle type high-pressure and high-temperature device was carried out at a pressure of 6.5 GPa and a temperature of 1400° C. for a period of 10 minutes to prepare sample 4 regarding this invention.

It was found from results of an X-ray diffractometry that no hexagonal boron nitride was present in sample 4, i.e. 100% of sample 4 was cubic boron nitride. Further, this sample 4 was a dense sintered body, and as a result of a hardness measurement by a micro-Vickers, it was found that sample 4 had a hardness of 6000 kg/mm$^2$ HV.

EXAMPLE 8

In the same manner as in Example 7, boron nitride prepared by the pyrolysis of borazine and aluminum nitride were weighed in the proportion of 60 mole % and 40 mole % respectively so that the total amount thereof might be 550 mg. These materials were placed in a girdle type high-pressure and high-temperature device in the same manner as in Example 7, and they were then treated at a pressure of 6.5 GPa and a temperature of 1300° C. for 15 minutes in order to prepare sample 5 according to the manufacturing method of this invention. It was found from results of an X-ray diffractometry that no hexagonal boron nitride was present in sample 5, i.e. 100% of sample 5 was cubic boron nitride. Further, the hardness of sample 5 was 5500 kg./mm$^2$ HV.

For comparison, a mixture of 60 mole % of commercially available hexagonal boron nitride and 40 mole % of aluminum nitride was treated under the same high-pressure and high-temperature conditions as described above, and as a result of an X-ray diffractometry, it was found that both cubic boron nitride and hexagonal boron nitride were present in the prepared sintered body, which had a hardness of 2500 kg/mm$^2$ HV.

EXAMPLE 9

In the same manner as in Example 7, boron nitride prepared by the pyrolysis of borazine and aluminum nitride were weighed out in the proportion of 90 mole % and 10 mole % respectively so that the total amount thereof might be 550 mg. These materials were placed in a girdle type high-pressure and high-temperature device in the same manner as in Example 7, and they were then treated at a pressure of 8.0 GPa and a temperature of 1800° C. for 5 minutes in order to prepare sample 6 according to the manufacturing method of this invention. It was found from results of an X-ray diffractometry that no hexagonal boron nitride was present in sample 6, i.e. 100 % of sample 6 was cubic boron nitride. Further, the hardness of sample 6 was 6300 kg/mm$^2$ HV.

For comparison, a mixture of 90 mole % of commercially available hexagonal boron nitride and 10 mole % of aluminum nitride was treated under the same high-pressure and high-temperature conditions as described above, and as a result of an X-ray diffractometry, it was found that both cubic boron nitride and hexagonal boron nitride were present in the prepared sintered body, which had a hardness of 3200 kg/mm$^2$ HV.

EXAMPLE 10

The procedure of Example 7 was repeated with the exception that borzaonaphthalene was substituted for borazine in order to prepare boron nitride through a pyrolysis, and to 540 mg of a mixture comprising 80 mole % of the thus prepared boron nitride and 20 mole % of aluminum nitride, 10 mg of aluminum were added. The resulting mixed powder was, in the same manner as in Example 7, treated at a pressure of 4.5 GPa and a temperature of 1700° C. for 15 minutes in order to prepare sample 7 according to the manufacturing method of this invention. It was found from results of an X-ray diffractometry that no hexagonal boron nitride was present in sample 7, i.e. 100 % of sample 7 was cubic boron nitride. Further, the hardness of sample 7 was 5800 kg/mm$^2$ HV.

For comparison, a mixture of 70 mole % of commercially available hexagonal boron nitride, 20 mole % of aluminum nitride and 10 mole % of aluminum was treated under the same high-pressure and high-temperature conditions as described above, and as a result of an X-ray diffractometry, it was found that both cubic boron nitride and hexagonal boron nitride were present in the prepared sintered body, which had a hardness of 2800 kg/mm$^2$ HV.

Incidentally, after the X-ray diffractometry and the measurement of the hardness, cubic boron nitride prepared in Examples 7 to 9 were boiled in a 2 N aqueous caustic soda solution for a period of 30 minutes in order to obtain 100% cubic boron nitride products.

As understood from the foregoing, since the method for preparing cubic boron nitride according to this invention provides excellent sintering effect, a dense and hard cubic boron nitride sintered body can be prepared under lower pressure and temperature conditions. Further, the method of this invention does not use cubic boron nitride as a starting material and is based on a direct method in which a high-pressure and high-temperature treatment is utilized only once, therefore it permits manufacturing the desired product in an inexpensive and economical manner. The cubic boron nitride sintered body prepared by the manufacturing method of this invention has a high hardness and denseness, therefore it is excellent in abrasion resistance and toughness. Since, having such properties, the sintered body thus prepared can be applied to materials for cutting tools, for example, turning tools and rotary drilling tools such as a reamer, and end mill and a drill, abrasion resistant tools such as a cutter and jigs for machine parts, and grinding tools. Additionally, since the cubic boron nitride has a high thermal conductivity and electrical resistance, the sintered body prepared in accordance with this invention can also be applied to materials for heat sinks in electronic circuits. In consequence, it is definite that the sintered body obtained by this invention is remarkably useful in industrial fields.

Further, the method for preparing cubic boron nitride according to this invention permits synthesizing cubic boron nitride at a lower pressure and temperature than in the conventional case where hexagonal boron nitride is employed as a starting material. According to the method of this invention, the conversion rate into cubic boron nitride is as high as 100% and the obtained cubic boron nitride is highly pure and fine.

Moreover, in the boron nitride manufacturing method of this invention, an activation energy at the conversion reaction into cubic boron nitride is very small, therefore it is possible to manufacture amorphous boron nitride in which the conversion rate into cubic boron nitride is high. Accordingly, the cubic boron nitride is suitable for a material for the cubic boron nitride sintered body to which much attention is now paid as a material for tools and heat sinks in electronic circuits, and it is thus apparent that the industrial value of the cubic boron nitride is great.

We claim:

1. A method for preparing a cubic boron nitride sintered body which comprises the steps of:
    pyrolyzing borazine and/or a borazine derivative consisting of boron, nitrogen and hydrogen to produce a boron nitride which has a B-H/B-N infrared absorption intensity of from about 0.1 to 0.7;
    mixing said boron nitride with a catalyst composed of a metal and/or a metallic compound; and
    reacting the mixture at a pressure of 3 GPa or more and at a temperature of 700° C. or more.

2. The method according to claim 1, wherein said mixture comprises 50 to 95 mole % of boron nitride and 5 to 50 mole % of said catalyst.

3. The method according to claim 1, wherein said reacting of said mixture is carried out at a pressure of 5.0 to 8.0 GPa and at a temperature of 1200° to 2000° C.

4. The method according to claim 1, wherein said borazine and/or borazine derivative are selected from the group consisting of borazine, borazonaphthalene, borazobiphenyl and 2,4-diaminoborazine.

5. The method according to claim 1, wherein said catalyst is selected from the group consisting of alkali metals of Li, Na, K, Rb, Cs and Fr; alkaline earth metals of Ca, Sr, Ba, Ra, Be and Mg; metals of Al, Si, Ti, Zr, Hf, V, Nb, Ta, Cr, Mo, W, Sb, Sn and Pb; alloys of the above alkali metals, alkaline earth metals and metals; and metallic compounds of $Li_3N$, $Li_3BN_2$, $Na_3N$, $Na_3BN_2$, $Ca_3N_2$, $Mg_3N_2$ and AlN.

6. The method according to claim 5, wherein said catalyst is aluminum nitride.

7. The method according to claim 1, wherein said mixture further comprises (a) at least one metal selected from the group consisting of Fe, Ni and Co and/or (b) at least one metallic compound of Ti, Zr, Hf, V, Nb, Ta, Cr, Mo, W or Si, said metallic compound being selected from the group consisting of carbides, nitrides, borides, silicides, oxides and mutual solid solutions of said carbides, nitrides, borides, silicides and oxides.

8. The method according to claim 1, wherein said pyrolyzing of said borazine and/or borazine derivative is carried out at a temperature of 150° to 700° C. and at a pressure of 10 MPa or more.

9. A method for preparing a cubic boron nitride which comprises the steps of:
    pyrolyzing borazine a:d/or a borazine derivative consisting of boron, nitrogen and hydrogen to produce a boron nitride which has a B-H/B-N infrared absorption intensity of from about 0.1 to 0.7;
    mixing said boron nitride with a catalyst composed of a metal and/or a metallic compound;
    reacting the mixture at a pressure of 3 GPa or more and at a temperature of 700° C. or more; and
    removing the catalyst from a formed product.

10. The method according to claim 9, wherein the removal of the catalyst is carried out by an acid treatment or an alkaline treatment.

11. The method according to claim 9, wherein said mixture comprises 50 to 95 mole % of boron nitride and 5 to 50 mole % of said catalyst.

12. The method according to claim 9, wherein said reacting of said mixture is carried out at a pressure of 5.0 to 8.0 GPa and at a temperature of 1200° to 2000° C.

13. The method according to claim 9, wherein said borazine and/or borazine derivative are selected from the group consisting of borazine, borazonaphthalene, borazobiphenl and 2,4-diaminoborazine.

14. The method according to claim 9, wherein said catalyst is selected from the group consisting of alkali metals of Li, Na, K, Rb, Cs and Fr; alkaline earth metals of Ca, Sr, Ba, Ra, Be and Mg; metals of Al, Si, Ti, Zr, Hf, V, Nb, Ta, Cr, Mo, W, Sb, Sn and Pb; alloys of the above alkali metals, alkaline earth metals and metals; and metallic compounds of $Li_3N$, $Li_3BN_2$, $Na_3N$, $Na_3BN_2$, $Ca_3N_2$, $Mg_3N_2$ and AlN.

15. The method according to claim 14, wherein said catalyst is aluminum nitride.

16. The method according to claim 9, wherein said mixture further comprises (a) at least one metal selected from the group consisting of Fe, Ni and Co and/or (b) at least one metallic compound of Ti, Zr, Hf, V, Nb, Ta, Cr, Mo, W or Si, said metallic compound being selected from the group consisting of carbides, nitrides, borides, silicides, oxides and mutual solid solutions of said carbides, nitrides, borides, silicides and oxides.

17. The method according to claim 9, wherein said pyrolyzing of said borazine and/or borazine derivative is carried out at a temperature of 150° to 700° C. and at a pressure of 10 MPa or more.

18. A method for preparing boron nitride which comprises pyrolyzing at least one compound selected from the group consisting of borazine and a borazing derivative consisting of boron, nitrogen and hydrogen to produce a boron nitride which has a B-H/B-N infrared absorption intensity of from about 0.1 to 0.7, said pyrolyzing being carried out at a temperature of 150° to 700° C. and at a pressure of 10 MPa or more.

19. The method according to claim 18, wherein said borazine and/or borazine derivative are selected from the group consisting of borazine, borazonaphthalene, borazobiphenyl and 2,4-diaminoborazine.

20. The method according to claim 18, wherein said pyrolysis is carried out at a temperature of 200° to 300° C. and at a pressure of 50 to 150 MPa for 30 to 120 minutes.

21. A method according to claim 8, wherein said pyrolyzing produces a composition consisting essentially of high-purity boron nitride.

22. A method according to claim 17, wherein said pyrolyzing produces a composition consisting essentially of high-purity boron nitride.

23. A method according to claim 18, wherein said pyrolyzing produces a composition consisting essentially of high-purity boron nitride.

* * * * *